(12) United States Patent
Peppe (10) Patent No.: US 11,102,207 B2
(45) Date of Patent: Aug. 24, 2021

(54) ADAPTIVE GREYLIST PROCESSING

(71) Applicant: T-Mobile USA, Inc., Bellevue, WA (US)

(72) Inventor: Brett C. Peppe, Bellevue, WA (US)

(73) Assignee: T-MOBILE USA, INC., Bellevue, WA (US)

(*) Notice: Subject to any disclaimer, the term of this patent is extended or adjusted under 35 U.S.C. 154(b) by 114 days.

(21) Appl. No.: 15/819,711

(22) Filed: Nov. 21, 2017

(65) Prior Publication Data
US 2019/0158501 A1    May 23, 2019

(51) Int. Cl.
*H04L 29/06*    (2006.01)
*H04W 12/06*    (2021.01)
*H04W 12/08*    (2021.01)

(52) U.S. Cl.
CPC ......... *H04L 63/101* (2013.01); *H04L 63/083* (2013.01); *H04W 12/06* (2013.01); *H04W 12/08* (2013.01)

(58) Field of Classification Search
CPC .... H04L 63/101; H04L 63/083; H04W 12/06; H04W 12/08
See application file for complete search history.

(56) References Cited

U.S. PATENT DOCUMENTS

| | | | |
|---|---|---|---|
| 6,351,773 B1* | 2/2002 | Fijolek | H04L 61/2015 709/222 |
| 8,312,540 B1 | 11/2012 | Kahn et al. | |
| 9,088,560 B1* | 7/2015 | Newstadt | H04L 63/08 |
| 9,148,424 B1* | 9/2015 | Yang | H04L 63/1416 |
| 10,091,221 B1* | 10/2018 | Yang | H04L 63/083 |
| 2003/0149900 A1* | 8/2003 | Glassman | H04L 63/0807 726/6 |
| 2003/0154396 A1 | 8/2003 | Godwin et al. | |
| 2004/0260952 A1 | 12/2004 | Newman et al. | |
| 2005/0144297 A1* | 6/2005 | Dahlstrom | H04L 63/101 709/229 |
| 2006/0282660 A1* | 12/2006 | Varghese | G06Q 20/341 713/155 |
| 2007/0011319 A1 | 1/2007 | McClure et al. | |
| 2009/0055912 A1* | 2/2009 | Choi | G06F 21/41 726/6 |
| 2009/0298470 A1* | 12/2009 | Huber | H04L 63/101 455/411 |

(Continued)

FOREIGN PATENT DOCUMENTS

WO    WO-2015023316 A1 *    2/2015    ............. G06F 21/51

OTHER PUBLICATIONS

U.S. Appl. No. 15/847,388, Final Office Action dated Mar. 3, 2020, 37 pages.

(Continued)

*Primary Examiner* — Samson B Lemma
*Assistant Examiner* — Zoha Piyadehghibi Tafaghodi
(74) *Attorney, Agent, or Firm* — Han Santos, PLLC (57) ABSTRACT

Adding an internet location to a greylist includes receiving a login pairing that includes login credentials and an internet location that the login credentials are received from. A successful login number of prior successful logins associated with the login pairing is determined and the internet location may be added to the greylist based at least in part on the successful login number.

20 Claims, 5 Drawing Sheets

(56) References Cited

U.S. PATENT DOCUMENTS

| | | | |
|---|---|---|---|
| 2010/0023620 A1* | 1/2010 | Kamikura | H04L 29/12066 709/225 |
| 2010/0211996 A1* | 8/2010 | McGeehan | H04L 63/107 726/4 |
| 2012/0237908 A1* | 9/2012 | Fitzgerald | G06F 21/88 434/236 |
| 2013/0232574 A1* | 9/2013 | Carothers | G06F 21/56 726/22 |
| 2014/0181968 A1 | 6/2014 | Ge et al. | |
| 2015/0113172 A1* | 4/2015 | Johnson | H04L 67/34 709/245 |
| 2015/0213251 A1 | 7/2015 | Turgeman | |
| 2015/0288715 A1* | 10/2015 | Hotchkiss | H04L 63/0876 726/7 |
| 2016/0105801 A1* | 4/2016 | Wittenberg | H04W 4/029 455/411 |
| 2016/0234232 A1 | 8/2016 | Poder et al. | |
| 2016/0248788 A1 | 8/2016 | Saito et al. | |
| 2016/0285888 A1* | 9/2016 | Arunkumar | H04L 63/107 |
| 2016/0344752 A1* | 11/2016 | Sterne | H04L 63/083 |
| 2016/0364465 A1 | 12/2016 | Sang et al. | |
| 2017/0181074 A1* | 6/2017 | Caldwell | H04W 12/08 |
| 2017/0308688 A1* | 10/2017 | Orihara | G06F 21/55 |
| 2018/0349643 A1 | 12/2018 | Kunjachan et al. | |
| 2019/0036930 A1* | 1/2019 | Bartik | H04L 63/101 |

OTHER PUBLICATIONS

U.S. Appl. No. 15/847,388, Non Final Office Action dated Oct. 24, 2019, 19 pages.

U.S. Appl. No. 15/847,388, Non Final Office Action dated Sep. 14, 2020, 58 pages.

* cited by examiner

|  | IP address 301 | IP address 303 | IP address 305 | IP address 307 |
|---|---|---|---|---|
| credential 391 | 5S, 2F | 25S, 2F | 3F, 1S | 1F |

300

|  | IP address 311 | IP address 313 | IP address 315 | IP address 317 | IP address 319 |
|---|---|---|---|---|---|
| credential 392 | 14F | 320S, 6F | 10S, 1F | 47S | 13F, 1S |

ADAPTIVE GREYLIST PROCESSING

BACKGROUND

Cybersecurity is an increasing priority for both public and private organizations that utilize web-based resources. At the same time, cyberattacks have increased and become more sophisticated. Organizations attempt to combat cyberattacks by sorting logon attempts into black lists (always deny access) and white lists (always provide access) where the black lists may have known bad-actor IP addresses and the white lists may include known authorized users.

However, existing cybersecurity methods have evolved to include multiple attack vectors and attack strategies and existing cybersecurity methods are susceptible to cyberattacks from multiple attack vectors. Moreover, proposed solutions to buttress the existing cybersecurity methods include complex operational support, vast processing resources, and/or high latency.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to adaptive greylist processing for networks. Embodiments of the disclosure may include receiving a login pairing that includes login credentials and an internet location that the login credentials are received from. In an embodiment, an Internet Protocol (IP) address is an internet location that is providing the login credentials. The internet location may be added to a greylist based at least in part on a successful number of logins associated with the login pairing. In one embodiment, a success metric of the login pairing may be determined and compared to a minimum success metric threshold to determine whether an internet location of the login pairing will be added to a greylist.

Additional factors may be included in the analysis of whether to add an internet location from a particular login pairing to the greylist. In one embodiment, an internet service provider (ISP) identified by the internet location is included in analysis of whether the internet location is added to the greylist. In one embodiment, a wireless carrier network identified by the internet location is included in analysis of whether the internet location is added to the greylist. In one embodiment, a geolocation of a login attempt based at least in part on the internet location is included in analysis of whether the internet location is added to the greylist. In one embodiment, the IPv4 or IPv6 format of an IP address of the login pairing is included in the analysis of whether the internet location is added to the greylist.

One particular risk for network security is the phenomenon of so called "Hack and Harvest" attacks where a bad-actor obtains the login credentials (e.g. username and password) associated with a particular website, email service, or other online account. Since users often reuse the same usernames and passwords across different accounts and services, the login credentials from a hacked website can be maliciously deployed to gain access to unrelated websites or services where the user utilized the same username and password. Hence, networks that have not been compromised themselves are indeed susceptible to cyberattacks from bad-actors maliciously utilizing login credentials gained from unrelated security breaches.

Existing greylist processes function by counting login attempts for each credential and when the unsuccessful login attempts reach a threshold within a particular time window, the IP address utilized may be put on a timeout (e.g. 24 hours). However, this technique is not especially effective for "Low and Slow attacks" and "Spread attacks." Furthermore, the existing greylist processes may identify IP addresses that are false positives, especially when a legitimate user is greylisted using an IP address associated with an organization (e.g. corporation). If the IP address associated with the organization is greylisted, it may result in other users within the organization being denied access when they attempt to login to their accounts. Hence, these false positives that result in erroneously assigning an IP address to a greylist may result in a high volume of electronic requests or phone calls to help centers related to the network that is erroneously denying access to legitimate users. Therefore, a greylist process that could be effective against spray attacks, spread attacks, low and slow attacks, while avoiding gateway false positives and requiring relatively few processing and bandwidth resources would be an improvement over the existing greylist processing techniques.

The techniques described herein may be implemented in a number of ways. Example implementations are provided below with reference to the following FIGS. 1-5.

Figure 1:
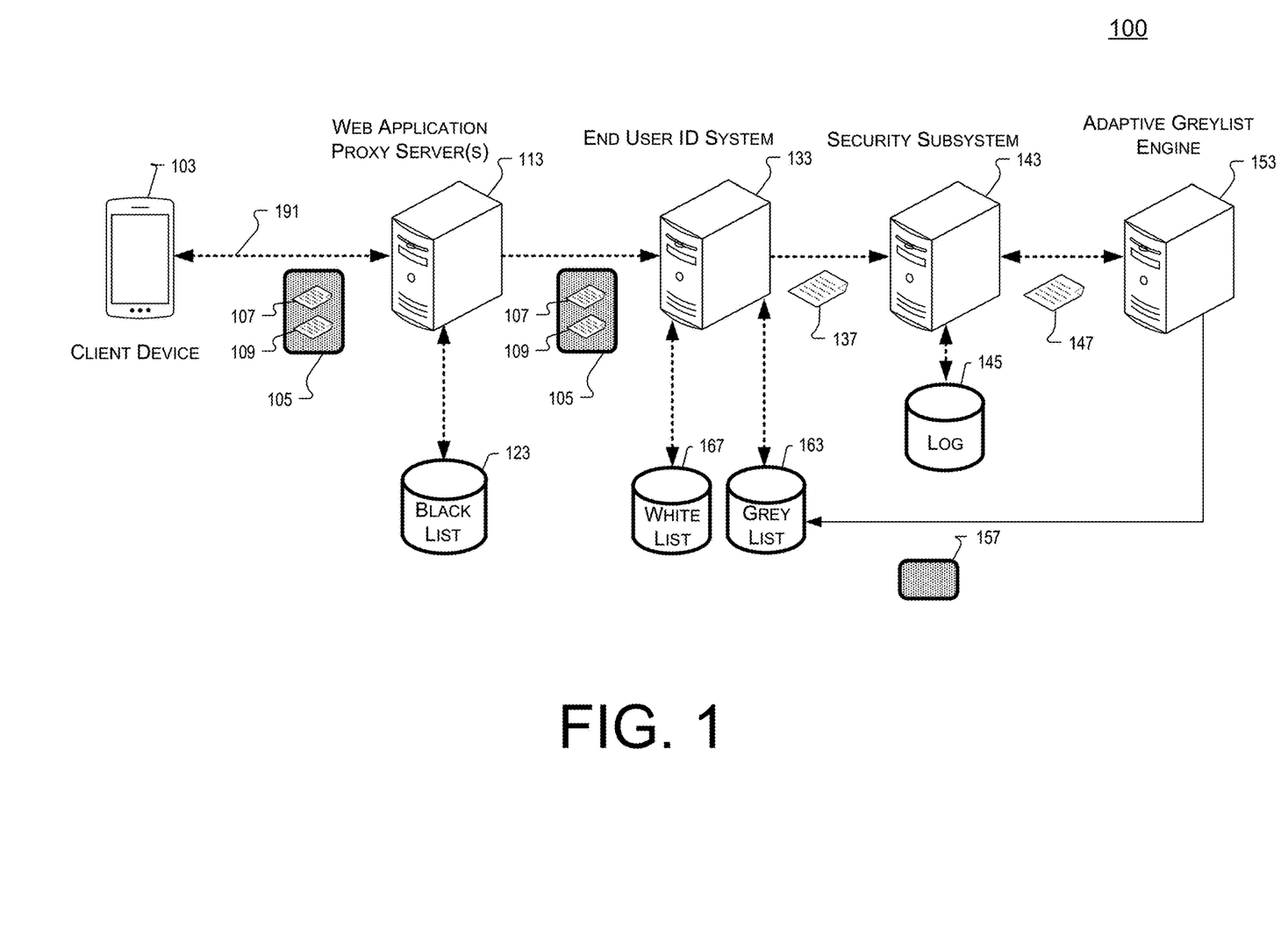
FIG. 1 illustrates an example architecture including a client device, an adaptive greylist engine, and a greylist.

FIG. 1 illustrates an example architecture 100 including a client device 103, a web application proxy server(s) 113, a blacklist 123, an end user ID (EUI) System 133, a whitelist 167, a Security Subsystem 143, an adaptive greylist engine 153, and a greylist 163. In FIG. 1, web application proxy server 113 may receive a login pairing 105 from a client device 103 via communication channel 191. The login pairing 113 may include login credentials 109 (e.g. username and password) and an internet location 107 that is providing the login credentials 109. In one embodiment, the internet location includes an IP address. In one embodiment, the internet location includes a domain name adhering to the Domain Name System (DNS).

Communication channel 191 may include and/or be routed through intermediary networks such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network. A cellular network may implement cellular data standards including Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. Client device 103 may be a feature phone, a smartphone, a tablet computer, a phablet, other mobile device, a desktop computer, or a laptop computer, for example.

Upon receipt of login pairing 105, Web Application Proxy (WAP) Server(s) 113 may perform firewall functionality by querying blacklist 123 to determine whether the internet location 107 of login pairing 113 is blacklisted. If the internet location 107 is blacklisted, login pairing 105 may not be forwarded to End User Identification (EUI) System 133 by WAP Server(s) 113. If the internet location 107 is not blacklisted, login pairing 105 may be forwarded to EUI System 133 as an access request.

EUI System 133 may receive the access request forwarded by WAP Servers(s) 113 and query a whitelist 167 and/or greylist 163. If the internet location 107 of the login pairing 105 is included in whitelist 167, client device 103 may be granted access to a network (not illustrated) when the login credentials 109 are validated by EUI System 133. If the internet location 107 of the login pairing 105 is not included in whitelist 167, EUI System 133 may query greylist 163. If the internet location 107 is included in greylist 163, client device 103 may be granted conditional access to the network. In one embodiment, if the internet location 107 is on greylist 163, additional verification steps (e.g. answers to additional user questions) are required for client device 103 to access the network.

EUI System 133 may report each login attempt by each client device to security subsystem 143 by sending a login report 137 to security subsystem 143. In one embodiment security subsystem 143 is operated by a server computer that is remote to EUI System 133. Security subsystem 143 may be operated by Splunk Inc. of San Francisco, Calif., in an embodiment. Security subsystem 143 may include a log 145 of each login attempt for a particular credential, for example. For each credential login attempt, a log 145 of an internet location, a date-time-stamp, and/or a status of the login attempt (e.g. success or failure) may be included in the log 145 stored and/or populated by Security Subsystem 143.

After updating the log 145 with the login report 137, credential update data 147 may be sent from security subsystem 143 to adaptive greylist engine 153. In response to receiving the credential update data 147, adaptive greylist engine 153 may request data related to a particular credential from security subsystem 143.

Adaptive greylist engine 153 may receive login pairing 105 that includes login credentials 109 and the internet location 107 that is providing the login credentials 109. In one embodiment, adaptive greylist engine 153 receives a successful login number of prior successful logins associated with the login pairing 105. In one embodiment, adaptive greylist engine 153 receives the successful login number from security subsystem 143. The internet location 107 may be added to greylist 163 at 157 by adaptive greylist engine 153 based at least in part on the successful login number. When an IP address is the internet location that is added to the greylist 163 for example, the IP addresses on greylist 163 may be given conditional access to a network.

Figure 2:
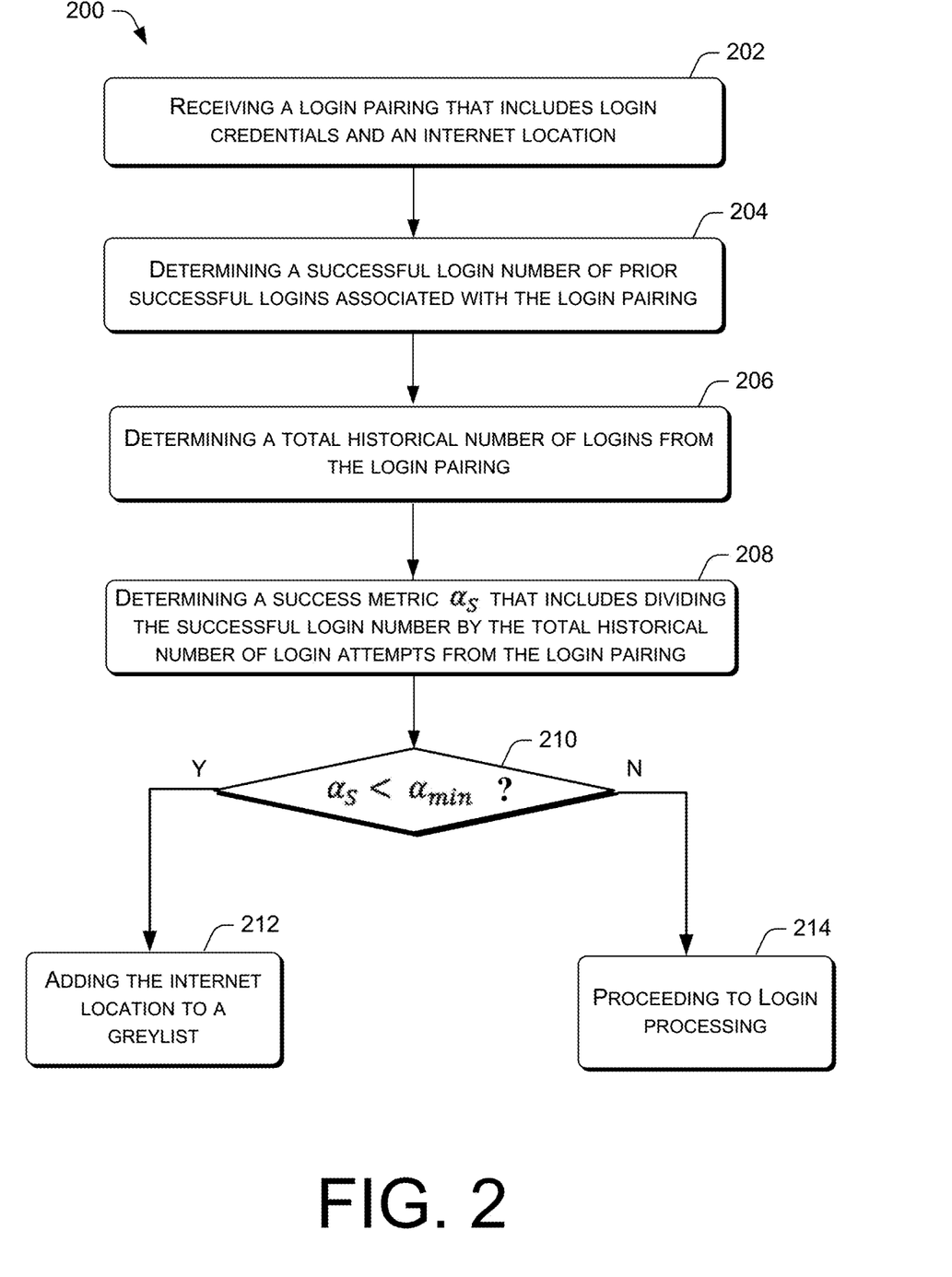
FIG. 2 is a flow diagram of an example process for adding an internet location to a greylist based at least in part on a success metric of historical logins of a login pairing.

FIG. 2 is a flow diagram of a particular example process 200 for adding an internet location to a greylist based at least in part on the successful login number. FIG. 2 presents an illustrative process 200 for adaptive greylist processing. Process 200 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process.

At block 202, a login pairing is received. The login pairing includes login credentials and an internet location that the login credentials are received from. The login credentials may be a username or an email address, for example. The login credentials may include a password or a passcode corresponding to the username and/or the email address.

In block 204, a successful login number of prior successful logins associated with the login pairing is determined.

Figure 3:
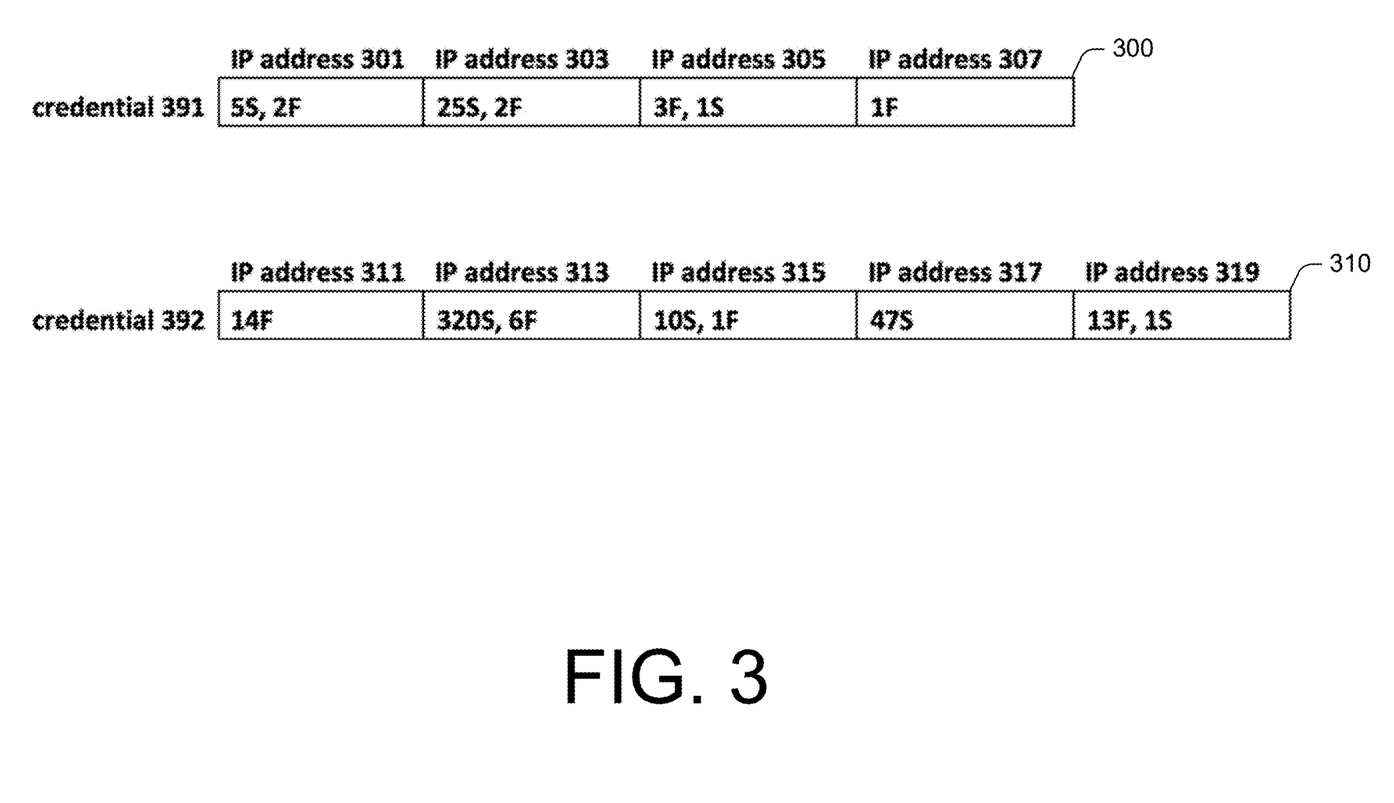
FIG. 3 illustrates example tables of login successes and failures associated with example login pairings.

FIG. 3 illustrates example tables of login successes and failures associated with example login pairings. In table 300, IP addresses are used as an example of an internet location that provided the login credentials, although other example tables may include internet locations other than IP addresses. In table 300, the login pairing that includes credential 391 and IP address 301 is a first login pairing. Similarly, the login pairing that includes credential 391 and IP address 303 is a second login pairing, the login pairing that includes credential 391 and IP address 305 is a third login pairing, and the login pairing that includes credential 391 and IP address 307 is a fourth login pairing.

In table 310, the login pairing that includes credential 392 and IP address 311 is a fifth login pairing, the login pairing that includes credential 392 and IP address 313 is a sixth login pairing, the login pairing that includes credential 392 and IP address 315 is a seventh login pairing, the login pairing that includes credential 392 and IP address 317 is an eighth login pairing, and the login pairing that includes credential 392 and IP address 319 is a ninth login pairing.

In one embodiment, tables 300 and 310 may be stored as logs (e.g. log 145) accessible to security subsystem 143.

Referring back to FIG. 2, if the login pairing received in block 202 matches the first login pairing of FIG. 3, the prior successful login number would be five since table 300 shows that the first login pairing history has five successful logins (illustrated as "5S") and 2 failed logins (illustrated as "2F"). In one embodiment, determining the successful login number of prior successful logins includes adaptive greylist engine 153 receiving the successful login number of a particular login pairing by querying security subsystem 143 with a query request that includes the login pairing.

In block 206 of FIG. 2, a total historical number of login attempts from the login pairing is determined. The total historical number of login attempts may represent the total historical number of login attempts since the login credentials were initiated. In one embodiment, the total historical number of login attempts is limited to a predetermined time window. For example, the predetermined time window may be login attempts from the prior 24 hours, prior 30 days, prior year, or otherwise. According to table 300, the total historical number of login attempts for the first pairing is seven (five successful logins and two failed logins). In one embodiment, determining a total historical number of logins from the login pairing includes receiving the total historical number of login attempts by querying security subsystem 143 with a query request that includes the login pairing.

In block 208, a success metric $\alpha_s$ is determined. Determining success metric $\alpha_s$ includes dividing the successful login number by the total historical number of login attempts from the login pairing, in one embodiment.

In block 210, if the success metric $\alpha_s$ is less than a minimum success metric threshold $\alpha_{min}$, the internet location is added to a greylist (e.g. greylist 163) in block 212. If success metric $\alpha_s$ is equal to or greater than the minimum success metric threshold $\alpha_{min}$, the internet location is not added to the greylist and the login pairing may proceed to normal login processing in block 214.

In one embodiment, the minimum success metric threshold $\alpha_{min}$ is 0.5. In the illustrative example of the first pairing of table 300, the success metric may be 0.714 (integer five divided by integer seven), which is not less than an example minimum success metric threshold $\alpha_{min}$ is 0.5, so the first login pairing would not be added to greylist 163, in this illustrative example. However, the fourth login pairing of table 300 would fall below an illustrative example minimum success metric threshold $\alpha_{min}$ 0.5, and thus IP address 307 would be added to greylist 163 with an example minimum success metric threshold $\alpha_{min}$ 0.5. Similarly, the fifth login pairing of table 310 would fall below an example minimum success metric threshold $\alpha_{min}$ 0.5, and thus IP address 311 would be added to greylist 163 with an example minimum success metric threshold $\alpha_{min}$ 0.5. In contrast, the first, second, third, sixth, seventh, eighth, and ninth login pairings of FIG. 3 would not be added to greylist 163 with an example minimum success metric threshold $\alpha_{min}$ 0.5.

Figure 5:
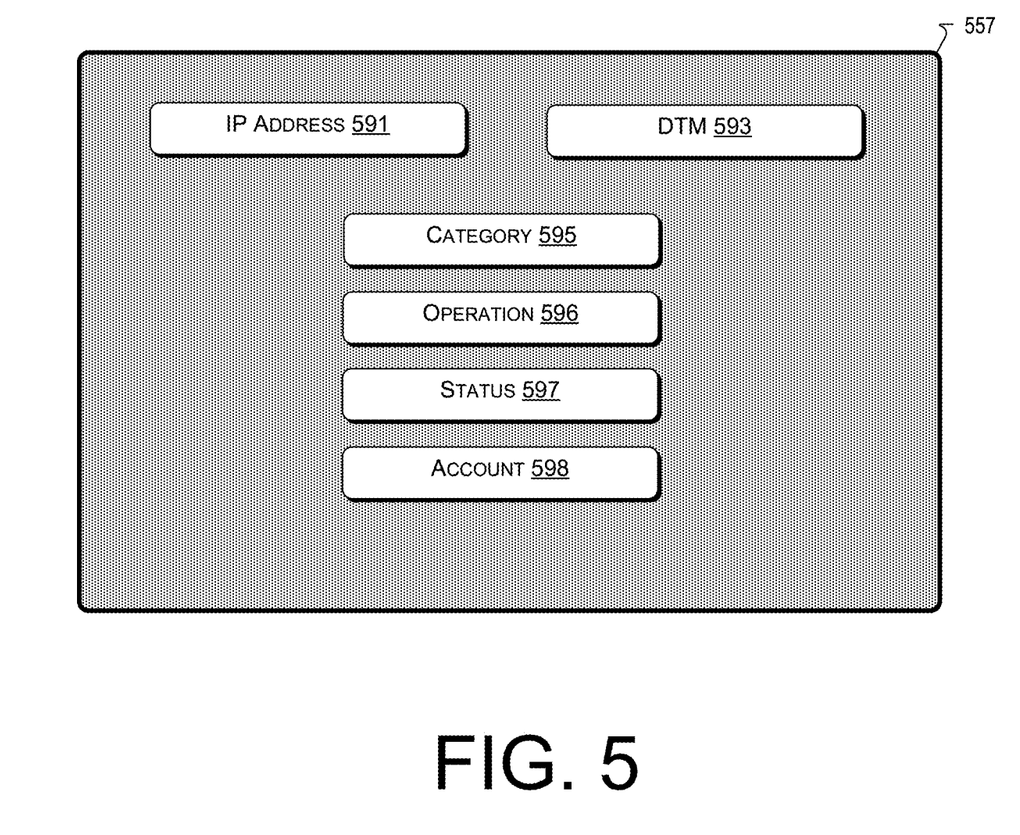
FIG. 5 illustrates an example greylist vector for amending a greylist.

In one embodiment, adding an IP address to greylist 163 includes writing the IP address to greylist 163. In one embodiment, a greylist vector is provided by adaptive greylist engine 153. FIG. 5 illustrates an example greylist vector 557 for amending a greylist that includes IP address 591 of the login pairing, a date time stamp (DTM) 593 of a login attempt associated with the login pairing, a category 595 of the login attempt (e.g. LOGIN or HACK_LOGIN), an operation 596 (e.g. Authenticate or Authorize), a status 597 of the login attempt (e.g. success or failure), and the login credentials 598 (e.g. username and password).

In one embodiment of process 200 of FIG. 2, a subsequent login pairing is received by architecture 100 subsequent to adding the IP address of login pairing 105 to greylist 163. The subsequent login pairing may include subsequent login credentials and a subsequent IP address that is providing the subsequent login credentials. The subsequent IP address may be compared to the greylisted IP addresses of greylist 163. When the subsequent IP address matches one of the greylisted IP addresses on greylist 163, additional verification of the login attempt may be performed by architecture 100.

In some embodiments of the disclosure, the minimum success metric threshold $\alpha_{min}$ is adjusted to account for additional factors having other indicia of a cybersecurity attack.

In one embodiment, an internet service provider is identified based at least in part on the IP address of the login pairing and the minimum success metric threshold $\alpha_{min}$ is adjusted based at least in part on the internet service provider that is identified. In one embodiment, the minimum success metric threshold $\alpha_{min}$ is adjusted downward when the IP address is associated with a known ISP. Analysis of network attacks indicates that fewer cyberattacks originate from known ISP IP addresses.

In one embodiment, a wireless carrier network is identified based at least in part on the IP address of the login pairing and the minimum success metric threshold $\alpha_{min}$ is adjusted based at least in part on the wireless carrier network that is identified. In one embodiment, the minimum success metric threshold $\alpha_{min}$ is adjusted downward when the IP address is associated with a known wireless carrier network. Analysis of network attacks indicates that fewer cyberattacks originate from known wireless carrier providers IP addresses.

In one embodiment, a geolocation of a login attempt is identified based at least in part on the IP address of the login pairing and the minimum success metric threshold $\alpha_{min}$ is adjusted based at least in part on the geolocation that is identified. Analysis of network attacks may show increased cyberattacks corresponding to different geolocations. For high risk geolocations based on historical network attack data, the minimum success metric threshold $\alpha_{min}$ may be increased.

In one embodiment, the minimum success metric threshold $\alpha_{min}$ is adjusted based at least in part on whether the login pairing (e.g. 105) is received in an IPv4 format or an IPv6 format. In one embodiment, the minimum success metric threshold $\alpha_{min}$ is increased when the login pairing is receiving in IPv4 format. Analysis of network attacks may show increased cyberattacks when a login pairing is received in IPv4 format.

In one embodiment, nearly sequential IPv4 addresses are utilized to gain access to the network with a same username, the minimum success metric threshold $\alpha_{min}$ is increased since nearly sequential IPv4 addresses may indicate a spread attack from a compromised server block. A spread attack occurs when a threat actor distributes logon attempts across a cluster of related hosts. In this particular embodiment, the nearly sequential IPv4 addresses may all be added to the greylist.

Figure 4:
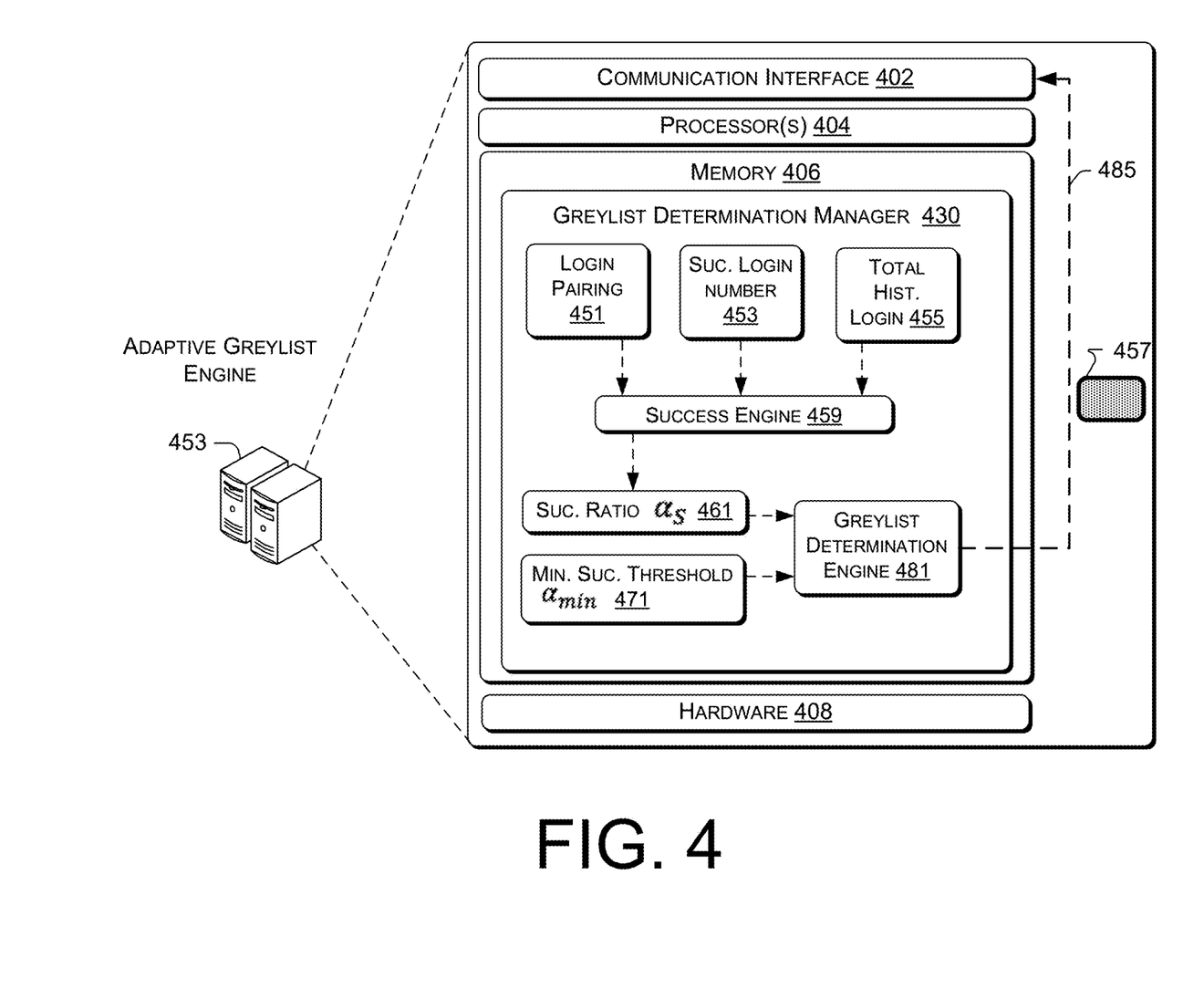
FIG. 4 is a block diagram showing various components of an adaptive greylist engine.

FIG. 4 is a block diagram showing various components of an example adaptive greylist engine 453. Adaptive greylist engine 453 may be one example of adaptive greylist engine 153. In FIG. 4, the adaptive greylist engine is implemented with server(s). The server(s) may include a communication interface 402, one or more processors 404, memory 406, and hardware 408. The communication interface 402 may include wireless and/or wired communication components that enable the server(s) of adaptive greylist engine to transmit data to and receive data from other networked devices such as security subsystem 143 and greylist 163. The hardware 408 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 406 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

In the illustrated embodiment, memory 406 includes greylist determination manager 430 that stores (or has access to) login pairing 451, a successful login number 453 of prior successful logins associated with login pairing 451, and a total historical number of login attempts 455 from the login pairing 451. Login pairing 451 is an example of login pairing 105 that includes an internet location 107 and login credentials 109. Greylist determination manager 430 may receive the login pairing 451 and then fetch the successful login number 453 and total historical number of login attempts from logs kept by security subsystem 143, in some embodiments. Greylist determination manager 430 may utilize communication interface 402 to send and received this data.

Greylist determination manager 430 includes a success engine 459 that receives the login pairing 451, the successful login number 453, and the total historical number of login attempts 455 from the login pairing 451. Success engine 459 may determine a success metric $\alpha_s$ 461. Determining the success metric $\alpha_s$ 461 may include dividing the successful login number 453 by the total historical number of login attempts 455.

Greylist determination manager 430 also includes a greylist determination engine 481 that receives the success metric $\alpha_s$ 461, and a minimum success metric threshold 471 $\alpha_{min}$. Greylist determination engine 481 may also receive the IP address that is included in the login pairing 451. In some embodiment (not illustrated in FIG. 4), the minimum success metric threshold $\alpha_{min}$ 471 is adjusted based on one or more of the attributes of the internet location (e.g. ISP, wireless carrier network, geolocation, IPv4 format) discussed above. Greylist determination engine 481 may add the IP address of login pairing 451 to the greylist 163 when the success metric $\alpha_s$ 461 is less than the minimum success metric threshold $\alpha_{min}$ 471. Adding the IP address to greylist 163 may include sending a greylist vector 457 to communication interface 402 via communication link 485. Greylist vector 457 may use a format similar to greylist vector 557.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method of processing logon attempts, the computer-implemented method comprising:
    receiving a login pairing in a login attempt by a source, wherein the login pairing includes a login credential and an internet location from which the login attempt is received;
    storing the login pairing in a log of login pairings of login credentials n association with respective internet locations;
    determining a successful login number of prior successful login attempts from the internet location using the login credential;
    determining a total historical number of login attempts from the internet location using the to credential within a predetermined time window;
    determining a success metric of login attempts from the internet location using the login credential, based at least in part on the successful login number of prior successful login attempts and the total historical number of login attempts;
    determining a format of the internet location from which the login attempt is received;
    based on the format of the internet location from which the login attempt is received, determining a minimum success metric threshold;
    adding the internet location to a grey list of internet locations when the success metric is less than a minimum success metric threshold; and
    granting, using at least one or more hardware processors, conditional access to a network to sources of received login attempts from internet locations on the greylist, wherein granting conditional access to the source of the login attempt includes additional verification of the source of the login attempt.

2. The computer-implemented method of claim 1, wherein determining the success metric includes dividing the successful login number of prior successful login attempts by the total historical number of login attempts.

3. The computer-implemented method of claim 1, further comprising:
    identifying an internet service provider (ISP) known to be associated with the internet location; and
    adjusting downward the minimum success metric threshold based at least in part on the ISP being known to be associated with the internet location.

4. The computer-implemented method of claim 1, further comprising:
    identifying a wireless carrier network based at least in part on the internet location; and
    adjusting the minimum success metric threshold based at least in part on the wireless carrier network that is identified.

5. The computer-implemented method of claim 1, further comprising:
    receiving a subsequent login pairing in a subsequent login attempt, wherein the subsequent login pairing includes a subsequent login credential and a subsequent IP address from which the subsequent login attempt is received;
    comparing the subsequent IP address to IP addresses of the internet locations on the greylist; and
    performing additional verification when the subsequent IP address matches one of the IP addresses on the greylist.

6. The computer-implemented method of claim 1, wherein adding the internet location to the greylist includes providing a greylist vector that includes an IP address of the internet location and at least one of a date time stamp of the login attempt, a category of the login attempt, a status of the login attempt, or the login credential.

7. The computer-implemented method of claim 1, wherein the login attempt is received from a mobile device.

8. The computer-implemented method of claim 1, further comprising:
    identifying the source of the internet location as being in a high-risk geolocation; and
    increasing the minimum success metric threshold based at least in part on the geolocation being high-risk.

9. The computer-implemented method of claim 1, wherein:
    determining the format of the internet location from which the login attempt is received comprises determining whether the internet location is in an IPv4 format or an IPv6 format, and determining the minimum success metric threshold comprises selecting a first minimum success metric threshold or a second minimum success metric threshold as the minimum success metric threshold based on whether the internet location is in an IPv4 format or an IPv6 format.

10. The computer-implemented method of claim 1, further comprising:
receiving data indicating network attacks and internet locations associated with the network attacks; and
analyzing a format of the internet locations associated with the network attacks,
wherein determining the minimum success metric threshold is further based on analyzing the format of the internet locations associated with the network attacks.

11. A device comprising:
one or more processors; and
memory having instruction stored therein, the instructions, when executed by the one or more processors, cause the one or more processors to perform operations comprising:
receiving a login pairing in a login attempt by a source, wherein the login pairing includes a login credential and an internet location from which the login attempt is received;
storing the login pairing in a log of login pairings of login credentials in association with respective internet locations;
determining a successful login number of prior successful login attempts from the internet location using the login credential;
determining a total historical number of login attempts from the internet location using the login credential within a predetermined time window;
determining a success metric of login attempts from the internet location using the login credential, based at least in part on the successful login number of prior successful login attempts and the total historical number of login attempts;
determining a format of the internet location from which the login attempt is received;
based on the format of the internet location from which the login attempt is received, determining a minimum success metric threshold;
adding the internet location to a greylist of internet locations when the success metric is less than a minimum success metric threshold; and
granting conditional access to a network to sources of received login attempts from internet locations on the greylist,
wherein granting conditional access to the source of the login attempt includes additional verification of the source of the login attempt.

12. The device of claim 11, wherein determining the success metric includes dividing the successful login number of prior successful login attempts by the total historical number of login attempts.

13. The device of claim 11, wherein the memory includes further instructions that when executed by the one or more processors, cause the one or more processors to perform operations comprising:
identifying an internet service provider (ISP) known to be associated with the internet location; and
adjusting downward the minimum success metric threshold based at least in part on the ISP being known to be associated with the internet location.

14. The device of claim 11, wherein the memory includes further instructions that when executed by the one or more processors, cause the one or more processors to perform operations comprising:
identifying a wireless carrier network based at least in part on the internet location; and
adjusting the minimum success metric threshold based at least in part on the wireless carrier network that is identified.

15. The device of claim 11, wherein the memory includes further instructions that when executed by the one or more processors, cause the one or more processors to perform operations comprising:
receiving a subsequent login pairing in a subsequent login attempt, wherein the subsequent login pairing includes a subsequent login credential and a subsequent IP address from which the subsequent login attempt is received;
comparing the subsequent IP address to IP addresses of the internet locations on the greylist; and
performing additional verification when the subsequent IP address matches one of the IP addresses on the greylist.

16. The device of claim 11, wherein adding the internet location to the greylist includes providing a greylist vector that includes an IP address of the internet location and at least one of a date time stamp of the login attempt, a category of the login attempt, a status of the login attempt, or the login credential.

17. The device of claim 11, wherein the memory includes further instructions that when executed by the one or more processors, cause the one or more processors to perform operations comprising:
identifying the source of the internet location as being in a high-risk geolocation; and
increasing the minimum success metric threshold based at least in part on the geolocation being high-risk.

18. The device of claim 11, wherein:
determining the format of the internet location from which the login attempt is received comprises determining whether the internet location is in an IPv4 format or an IPv6 format, and
determining the minimum success metric threshold comprises selecting a first minimum success metric threshold or a second minimum success metric threshold as the minimum success metric threshold based on whether the internet location is in an IPv4 format or an IPv6 format.

19. The device of claim 11, wherein the memory includes further instructions that when executed by the one or more processors, cause the one or more processors to perform operations comprising:
receiving data indicating network attacks and internet locations associated with the network attacks; and
analyzing a format of the internet locations associated with the network attacks,
wherein determining the minimum success metric threshold is further based on analyzing the format of the internet locations associated with the network attacks.

20. One or more non-transitory computer-readable media storing computer-executable instructions that upon execution cause one or more processors to perform acts comprising:
receiving a login pairing in a login attempt by a source, wherein the login pairing includes a login credential and an internet location from which the login attempt is received;

storing the login pairing in a log of login pairings of login credentials in association with respective internet locations;
determining a successful login number of prior successful login attempts from the internet location using the login credential;
determining a total historical number of login attempts from the internet location using the login credential within a predetermined time window;
determining a success metric of login attempts from the internet location using the login credential, based at least in part on the successful login number of prior successful login attempts and the total historical number of login attempts;
determining a format of the internet location from which the login attempt is received;
based on the format of the internet location from which the login attempt is received, determining a minimum success metric threshold;
adding the internet location to a greylist of internet locations when the success metric is less than a minimum success metric threshold; and
granting conditional access to a network to sources of received login attempts from internet locations on the greylist,
wherein granting conditional access to the source of the login attempt includes additional verification of the source of the login attempt.

* * * * *